UNITED STATES PATENT OFFICE.

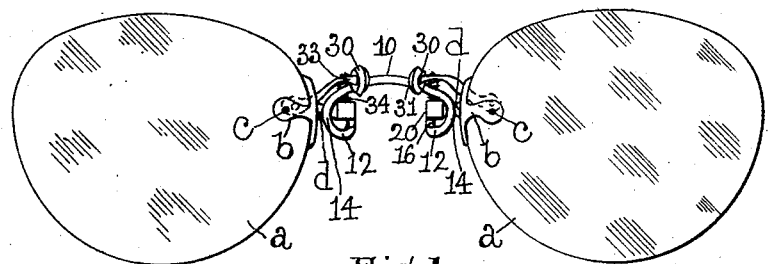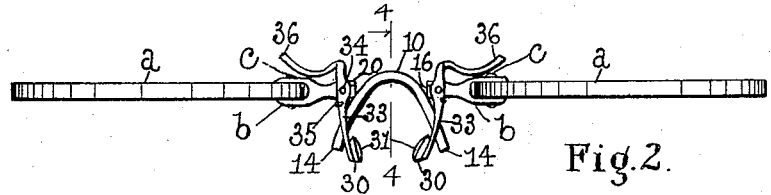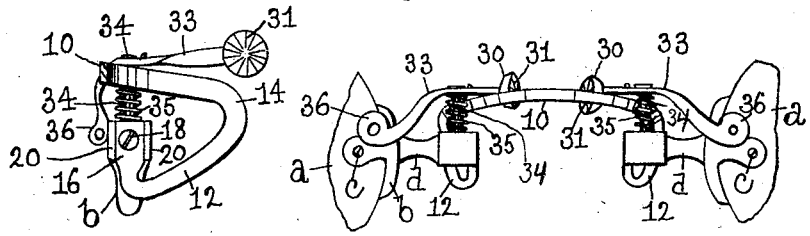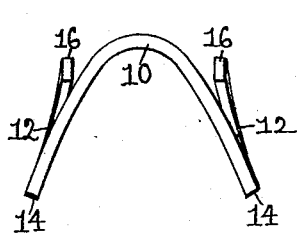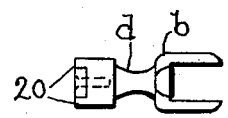

JAMES P. BARLOW, OF WINTHROP, MASSACHUSETTS.

EYEGLASSES.

965,499.

Specification of Letters Patent.  Patented July 26, 1910.

Application filed September 26, 1907. Serial No. 394,613.

*To all whom it may concern:*

Be it known that I, JAMES P. BARLOW, a citizen of the United States, residing in Winthrop, in the county of Suffolk and State of Massachusetts, have invented an Improvement in Eyeglasses, of which the following description, in connection with the accompanying drawings, is a specification, like characters on the drawings representing like parts.

This invention relates to eyeglasses and has for its object to provide the same with a saddle, bridge or nose-piece of novel construction, as will be described, which permits the same to be made substantially rigid and obtain a broad or extended bearing upon the bony part of the sides of the nose, so that slipping or wiggling of the eye-glasses on the nose is prevented or at least reduced to a minimum. Provision is made for firmly securing the eye-glasses on the nose with the least possible discomfort, and for this purpose, I employ gripping members or guards which are separate from the saddle or bridge and arranged to engage the soft or fleshy part of the nose in proximity to the forehead, as will be described. The saddle or nose piece is preferably detachably secured to the studs or posts on the clips or settings which are fastened to the lenses, so that the nose piece or saddle may be used with studs or posts of different lengths, whereby any given saddle may be used in eye-glasses having different distances between the pupillary centers of the lenses. Provision is also made for adjusting the eye-glasses for deep set and bulging eyes as will be described. These and other features of this invention will be pointed out in the claims at the end of this specification.

Figure 1 is a rear elevation of a pair of eye-glasses embodying this invention. Fig. 2, a plan of Fig. 1. Fig. 3, a detail in front elevation of the glasses shown in Fig. 1. Fig. 4, a section on the line 4—4, Fig. 2 on an enlarged scale. Fig. 5, a detail in plan on an enlarged scale of the saddle or nose piece, and Fig. 6, a detail in plan of one of the clips to be referred to.

Referring to the drawing $a$ represents the lenses, to which are secured the clips or settings $b$ by screws $c$ or in any other suitable or usual manner. The clips $b$ are provided with posts $d$, to which are detachably secured the opposite ends of a saddle, bridge or nose piece, which in accordance with this invention is constructed so as to obtain a broad surface engagement with the bony part of the nose on the opposite sides of the same. For this purpose, the saddle or nose piece is provided with substantially V or wedge-shaped side pieces with the apexes of the wedges diverging so as to conform to the wedge shape of the nose of the wearer and permit the curved center portion to engage the bridge of the nose. The wedge-shaped side pieces and the curved center portion may and preferably will be formed in one piece or strip of metal, which may be effected by first bending or shaping the metal strip to form the curved center portion 10 to fit the bridge of the nose in proximity to the forehead and bending the free ends of the strip back flatwise in a substantially horizontal plane and then forward edgewise in a substantially vertical plane toward the curved center portion 10 to form arms 12, which coöperate with the ends of the center portion 10 to form wedge-shaped bends having the apexes 14, said arms preferably being bent upwardly to form fingers 16, which are preferably detachably secured to the posts $d$, as by screws 18 (see Fig. 4). The saddle or nose piece is not designed to exert a gripping action on the sides of the nose but merely to rest thereon and form a broad bearing, consequently it may be made of a substantially rigid metal strip which possesses sufficient flexibility to be bent or shaped but not such as to obtain a spring action.

To prevent rotary movement of the posts $d$ with relation to the saddle or nose piece and vice versa, the fingers 16 are provided with substantially straight sides, which engage lips or projections 20 on the opposite sides of the posts $d$, as clearly shown in Figs. 4 and 6.

By reference to Figs. 1 and 4, it will be seen that the V or wedge-shaped sides of the saddle or nose piece extend transversely of the sides of the nose and form substantially wide or extended surfaces for engagement with the bony part of the sides of the nose, and in this manner slipping or vibration of the eye-glasses while in use is prevented or at least reduced to a minimum, because such slipping movement is transversely of the V-shaped bearing.

By making the saddle or nose piece detachable from the posts $d$, it will be seen, that the same size of saddle may be used with posts of different lengths, and the ends of the saddles may be bent toward or from each other, with the result that a single size of saddle or nose-piece may serve as a standard for a large number of lenses having different pupillary centers. So also the fingers 16 may be bent toward or away from the apexes 14 or backward or forward with relation to the eyes, so as to adjust the lenses in one case to eyes which are deep set, and in the other case to eyes which bulge.

Provision is also made for effectively gripping the fleshy part of the nose in close proximity to the forehead, and for this purpose I have provided two gripping members comprising nubs or knobs 30 having substantially round contact surfaces 31, which are preferably knurled or otherwise made so as to afford a better engagement with the nose. The knobs or nubs 30 are firmly secured to the ends of levers 33 mounted to turn in a horizontal plane on pivot studs or pins 34 erected from the posts $d$, said levers being located above the saddle or nose piece and extended across the same (see Fig 2). The levers 33 are engaged by helical springs 35, which encircle the studs or pins 34 and serve to keep the nubs or knobs 30 in yielding contact with the fleshy, substantially flat part of the nose in close proximity to the forehead. The levers 33 may be provided with arms 36, by means of which the levers may be turned on their pivots against the action of the springs, when it is desired to release the glasses from the nose. The knobs or nubs 30 constitute guards or gripping members, which do not in any way interfere with the engagement of the saddle or nose piece with the nose, for the reason that they are located at the ends of the levers above the same and engage the soft part of the nose.

By reference to the drawing and especially Fig. 4, it will be observed that the studs or posts on the lenses are attached to the fingers 16 below the center piece 10 and that the broad bearing surfaces engage the upper part of the sides of the nose, which construction enables the broad bearing surfaces to make contact with the bony part of the nose above the twitching muscles of the nose, which muscles extend upward from the lower part of the nose for a portion of its length. As a result, the action of these twitching muscles does not affect the engagement of the bearing surfaces with the bony part of the nose, and the danger of the eye-glasses being dislodged from the nose from this source is avoided or at least reduced to a minimum.

I have herein shown one construction of eye-glass embodying this invention, but I do not desire to limit my invention to the particular construction shown.

Claims:
1. In eye-glasses, in combination, two lenses, clips or settings secured to said lenses and provided with studs or posts, and a substantially rigid saddle or nose piece comprising a curved center portion and substantially V-shaped side portions extended transversely of the sides of the nose and forming substantially extended bearing surfaces for engagement with the bony part of the nose and having their apexes at the rear of said center portion, and fingers extended upwardly from the lower portion of said side portions toward the center portion and substantially below the same, and means to secure said fingers to said studs or posts substantially as described.

2. In eye-glasses, in combination, two lenses, clips or settings secured thereto and provided with studs or posts, and a substantially rigid saddle or nose piece comprising a center portion to engage the bridge of the nose and substantially wide diverging V-shaped side portions extended transversely of the sides of the nose to engage the bony part of the sides of the nose with their apexes at the rear of the center portion and having fingers extended upwardly toward said center portion substantially below the same, and means to detachably secure said fingers to said studs or posts, substantially as described.

3. In eye-glasses, a substantially rigid saddle or nose piece comprising a center portion to conform to the nose of the wearer in proximity to the forehead, substantially wide diverging portions extended transversely of the sides of the nose to engage the bony part of the sides of the nose below said center portion, and fingers extended upwardly from said diverging portions toward said center portion and substantially below the same, substantially as described.

4. In eye-glasses, in combination, two lenses, clips or settings secured to said lenses and provided with studs or posts, a substantially rigid saddle or nose piece comprising a curved center portion to engage the bridge of the nose in proximity to the forehead, arms extended rearwardly from said center portion and then forwardly to form substantially wedge-shaped bearing surfaces extended transversely of the sides of the nose, fingers extended upwardly from the front portion of said wedge-shaped bearing surfaces toward the said curved center portion, means for detachably securing said fingers to said posts or studs, and means for gripping the nose of the wearer, substantially as described.

5. In eyeglasses, in combination, two lenses, clips or settings secured thereto and provided with studs or posts, a substantially rigid saddle or nose piece comprising a center portion to engage the bridge of the nose in proximity to the forehead and substantially wide diverging V-shaped side portions extended transversely of the sides of the nose to engage the bony part of the nose below the center portion and having their apexes at the rear of said center portion, and means to secure said diverging portions below the center portion of said saddle to said studs or posts, substantially as described.

6. In eye-glasses, a substantially rigid saddle or nose piece comprising a single piece of metal shaped to form a curved center portion from which arms are extended rearwardly, then forwardly to extend transversely of the sides of the nose of the wearer, and then upwardly, substantially as described.

7. In eye-glasses, in combination, two lenses, clips or settings secured thereto and provided with studs or posts, a substantially rigid saddle or nose piece comprising a center portion to engage the bridge of the nose in proximity to the forehead and substantially wide diverging side portions extended transversely of the sides of the nose to engage the bony part of the nose below the center portion and having their apexes at the rear of said center portion, means to secure said diverging portions below the center portion of said saddle to said studs or posts, and means separate from the saddle or nose piece for gripping the nose of the wearer, substantially as described.

In testimony whereof, I have signed my name to this specification in the presence of two subscribing witnesses.

JAMES P. BARLOW.

Witnesses:
 JAS. H. CHURCHILL,
 J. MURPHY.